US006305015B1

(12) United States Patent
Akriche et al.

(10) Patent No.: US 6,305,015 B1
(45) Date of Patent: Oct. 16, 2001

(54) INFORMATION PROCESSING SYSTEM ARCHITECTURE

(75) Inventors: Jean Akriche, Margency; Jean-Marie Lanquetin, Versailles; Alain Leteinturier, Paris; Gérard Sitbon, Vitry; Jean-François Touzan, Massy, all of (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/108,193

(22) Filed: Jul. 1, 1998

(30) Foreign Application Priority Data

Jul. 2, 1997 (FR) .................................................. 97 08332

(51) Int. Cl.[7] ....................................................... G06F 9/45
(52) U.S. Cl. .................................................. 717/11; 717/1
(58) Field of Search .......................... 717/11, 1; 709/220, 709/221, 222; 713/100

(56) References Cited

U.S. PATENT DOCUMENTS

| | | | |
|---|---|---|---|
| 5,742,829 | * 4/1998 | Davis et al. | 395/712 |
| 5,909,581 | * 6/1999 | Park | 395/712 |
| 6,009,274 | * 12/1999 | Fletcher et al. | 395/712 |
| 6,049,671 | * 4/2000 | Slivka et al. | 395/712 |

OTHER PUBLICATIONS

Winslett et al. A Model–Based Approach to Updating Databases with Imcomplete Information. ACM. pp. 167–196, Jun. 1988.*

Tschammer V Et Al: "On the Co–operative Management of Domains in Open Distributed Systems", Proceedings of the Fourth Workshop on Future Trends of Distributed Computing Systems (CAT. No. 93TH0574–4), 1993 4TH Workshop on Future Trends of Distributed Computing Systems, Lisbon, Portugal, Sep. 22–24, 1993, ISBN 0–8186–4430–3, 1993, Los Alamitos, CA, USA, IEEE Comput. Soc. Press, USA, pp. 47–53, XP002059529.

(List continued on next page.)

Primary Examiner—Mark R. Powell
Assistant Examiner—Wei Zhen
(74) Attorney, Agent, or Firm—Miles & Stockbridge P.C.; Edward J. Kondracki

(57) ABSTRACT

An information processing system architecture comprising a set of software products subdivided into domains (21–23), each of which comprises at least one software product. Each domain (21–23) contains specific information comprising an identifier of the domain (21–23), its attributes, and data on the software products comprising it. These data allow the installation and/or the updating of the domains (21–23) in accordance with a set of rules. The software products are constituted of products that are fully integrated into the domains, which follow standard installation and/or updating rules common to the system, and of heterogeneous products from external sources whose packaging and installation and/or updating rules remain specific. A consistency check of the version can be carried out on all or some of these external products. The system (2) comprises at least two specific domains for the operating system (21) and the operations monitor (23) of the system (2).

13 Claims, 3 Drawing Sheets

OTHER PUBLICATIONS

Lee K–H: "Design and Implementation of a Multi–Domain Configuration Management System" Proceedings of IEEE Singapore International Conference on Networks/Internat'l Conference on Information Engineering '93. Theme: Communications and Networks for the Year 2000 (CAT. No.93TH0588–4), Proceedings of IEEE Singapore International Conference, ISBN 0–7803–1445–X, 1993, New York, NY, USA, IEEE USA, pp. 258–262, vol. 1, XP 002059530.

Sloman M S Et Al: "Domain Management for Distributed Systems", Integrated Network Management, 1. Proceedings of the IFIP TC 6/WG 6.6Symposium, Boston, MA, USA, May 16–17, 1989, ISBN 0–444–87398–8, 1989, Amsterdam, Netherlands, North–Holland, Netherlands, pp. 505–516.

Lubkin, D C: "DSEE: A Software Configuration Management Tool"—Packard Journal, vol. 42 No. 3, Jun. 1, 1991, pp. 77–83 XP000260722, p. 79, right col, line 49—p. 82, right hand col., line 5.

* cited by examiner

INFORMATION PROCESSING SYSTEM ARCHITECTURE

BACKGROUND OF THE INVENTION

1. Field of the Invention

The present invention relates to an architecture for an information processing system.

More particularly, it relates to an architecture for large scale systems of the type known as "mainframes".

2. Description of Related Art

Systems of this type, which are very complex, integrate large numbers of subsystems, both hardware and software, which cooperate with one another. It is not unusual for the software products that are components of these systems to comprise hundreds of thousands, if not millions of lines of code.

In this context, one of the most difficult problems to solve is to obtain consistency and compatibility between the various components, particularly when they must be updated (change-overs to more recent versions, addition of modules or functions, etc.).

In addition to the intrinsic complexity noted, it is also necessary to take into account the fact that the various products comprising the system are from different sources, whether internal (even when common development rules are in force) or external (products available on the market).

In the prior art, there are two main types of architectures.

A first architecture belongs to the so-called "proprietary" type. This term designates systems whose architecture is designed by the computer hardware manufacturer.

This architecture is essentially characterized by advanced integration, and exists in the form of a monolithic system. FIG. 1 attached to the present description schematically illustrates an architecture of this type.

The system 1 of FIG. 1 comprises a hardware platform 10 that cooperates with a monolithic set 11 of software systems. These may include an operating system 110, or "OS", a management system 111, which supervises the system functions, and a production system 112. The latter can include, for example, database managers 113, and transaction processors 114. The hardware platform 10 comprises the usual devices of an information processing system: central processing unit, central storage, mass storage, etc., which need not be described in further detail.

In the system of FIG. 1, all the components of the monolithic set 11 are supported during the initial installation and during subsequent updates (changes in the version of the system 1). In this type of environment, the consistency of the system is obtained through the global validation of the interfaces between all the components. For the user, these dispositions guarantee a substantial robustness of the system regardless of its evolution. Moreover, they allow simplified monitoring of the successive versions of the system. Lastly, they ensure maximum availability and high security in operation, since the risks of malfunction are reduced to a minimum.

However, they also entail constraints and serious drawbacks.

These arise from the fact that the systems are monolithic. Regardless of the component to be changed and/or the function to be added, it is necessary to upgrade the entire system. The update can only occur globally.

A practical way to illustrate this drawback is to consider, by way of example, the case of a user who only wants to replace the database management software 113, or to update it with a more recent version. In this hypothesis, the user would be obligated to install a new version of the entire system.

This presupposes, moreover, that this new version comprising the database management software to be replaced or updated is available.

Finally, it results in a substantial amount of unavailability of the information processing system, usually several days for very large scale systems.

It follows that this type of architecture has relatively little flexibility and affords limited possibilities for upgrading.

A second architecture belongs to the so-called "open" type. This term designates open systems whose architecture is not defined by a single manufacturer. These open systems have appeared, in particular, with the emergence of operating systems of the "UNIX" (registered trademark) type or similar systems, for example "AIX" (registered trademark).

It is clear that this type of architecture is very advantageous, since it makes it possible to have software that it heterogeneous, that is, from various sources, coexist in the same machine.

For this type of architecture, the installation and/or updating of software involves only the product itself, and not the system as a whole.

Since basic components can be installed or updated at any time, an "open" architecture offers very high flexibility and substantial ease of upgrading, at least in theory.

In reality, this type of architecture is not exempt from drawbacks, either. In particular, it offers no guarantee of proper operation with the other software components and there are potentially various incompatibility problems.

However, despite its inherent drawbacks, a system with an open architecture remains very advantageous for users.

In effect, it makes it possible to fully or partially meet the needs of information systems users, which currently include, among other things:

- autonomy, that is, the ability to upgrade one or more products of the system independently from the rest of the system;
- parallelism, that is, the ability to run several versions of the same product simultaneously;
- compatibility, that is, being able to rely on a guarantee of forward compatibility of the products and of the interfaces between products;
- updating during the normal operation of the system, that is, being able to change versions of a product without stopping operation, or at least with a minimal stop;
- back-out capability, that is, the ability to return to an earlier version of a product in case of a problem, without stopping operation;
- upgrade control, that is, the capability to remain in control of the upgrade process using automated and simplified procedures;
- and fast upgrades and maintenance, that is, being able to count on a minimum delay between a request for an upgrade or a correction and its effective installation on site.

SUMMARY OF THE INVENTION

The object of the invention is to eliminate the drawbacks of both types of architectures of the prior art, while maintaining the advantages of each of them.

Another object of the invention is to fully respond to the needs of users listed above.

For this reason, and according to a main characteristic, the invention proposes a domain-based architecture.

A domain combines a set of functionalities offered by software components of the system. It has its own characteristics and evolves independently. The system is therefore comprised of a set of domains having a minimum of interdependencies, which guarantees global consistency.

In other words, flexibility of installation and updating is introduced at a macroscopic level which can always be controlled, namely the domain, within which consistency is always assured.

Each domain, without exception, is "seen" by the user in the same way, specifically by means of attributes assigned to it and a descriptor.

Thus, the subject of the invention is an architecture for an information processing system, this system comprising a hardware platform that cooperates with a set of software products, characterized in that this set is subdivided into subsets called domains, each of which comprises at least one of these software products, in that each domain contains a subset called a descriptor which gives access to specific determined information, this information comprising at least one identifier of the domain and data describing the software products that comprise it, and in that means are provided for enabling these domains to be installed and/or updated based on predetermined rules and on the specific determined information.

It is noted that the architecture according to the invention has many advantages, including:

update flexibility: there is never any need to update the entire system, since updates can be performed domain by domain.

reduced unavailability of the machine: the update can be performed in several phases, and those relative to some domains which require a halt in production can take place at selected times. In an advantageous variant of the invention, most of the domains can be updated on a secondary copy during which production continues on a primary copy. Only the final switch-over, for specific domains, may involve a halt in production.

security of version changes: since some domains can run in more than one occurrence, they allow testing and back-out phases in case of a problem.

reduction of update times: since the updates are performed at the domain level, their execution can be studied and planned to best advantage, in accordance with operating constraints.

flexibility in the choice of configurations installed: the user has the ability to install only the domains that are necessary and to completely control the upgrading of the versions of each domain, limited only by the constraints imposed by the possible dependencies and the support and maintenance conditions.

In summary, the architecture according to the invention makes it possible to combine the advantages of architectures of the "proprietary" and "open" types: robustness, availability, security, flexibility and upgrade capability.

BRIEF DESCRIPTION OF THE DRAWINGS

The invention will be better understood, and other characteristics and advantages will become apparent with the reading of the following description in reference to the appended drawings, in which.

DESCRIPTION OF THE PREFERRED EMBODIMENTS

Figure 1:
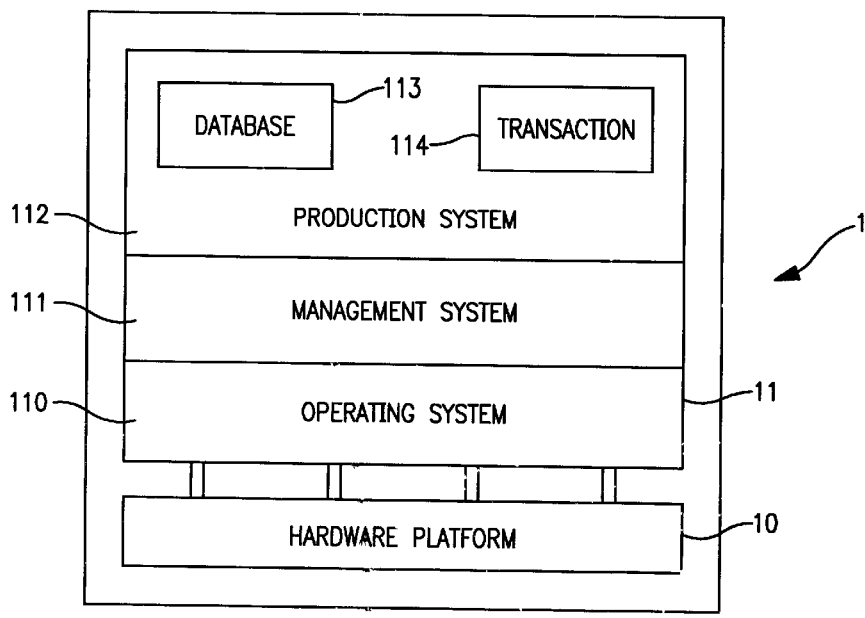
FIG. 1 schematically illustrates an architecture of the "proprietary" type according to the prior art.
Figure 2:
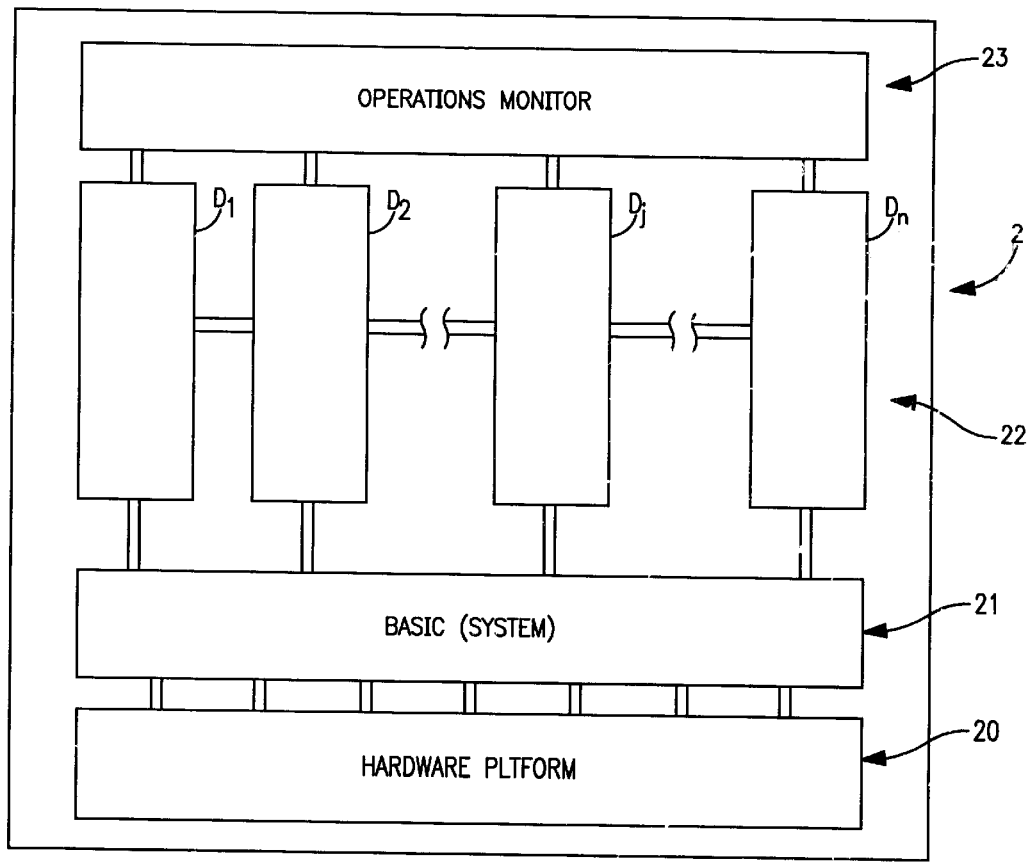
FIG. 2 schematically illustrates an exemplary embodiment of an architecture according to the invention.

The following is a detailed description of the information processing system architecture according to the invention in reference to FIG. 2.

As before, the system 2 comprises a hardware platform 20. However, according to an important characteristic of the invention, the set of software and software packages is divided into domains 21 through 23. More particularly, there is a set of domains $D_1, D_2, \ldots, D_j, \ldots, D_n$, grouped under the general reference 22, and two specific domains 21 and 23. The latter two domains are, respectively, the domain 21, which provides the operating system (or "OS") and the basic software associated with the system, and the domain 23, which provides the operations monitor of the system 2. The system 2 comprises, at minimum, these two domains 21 and 23, in addition to the platform 20. It is the version of the domain 23, the operations monitor of the system, that completely identifies the entire system 2 and its basic components, that is, as explained below, the various domains and the functionalities they provide.

The subscripts $_j$ and $_n$ marking the domains are purely arbitrary, $_j$ being an intermediate subscript and $_n$ being the maximum number of domains (not including the specific domains 21 and 23), at least in a given configuration state of the system.

The other domains 22 are optional and are selected by the user according to his precise needs and the application in question. Hereinafter, these domains will be called "general-purpose domains," in the sense that they are "seen" in a similar way by the system, as explained below, even if their content is different. Thus, the system 2 is completely modular at the domain level.

To illustrate the concepts, the following domains can be implemented in the system: system management functions, batch processing functions, database management functions, security functions, transaction processing management functions, and interoperability functions.

A determined system 2 which meets the needs of the user is installed in a given state. In other words, the configuration and the versions of the domains are precisely defined.

This installation can be obtained in two ways:

first of all, the initial installation itself can be what is called a "key-in-hand" installation, that is a preconfiguration carried out in the factory.

it can also be an incremental updating of the machine at the operating site. The updates in this case involve one or more domains, as necessary. But unlike the "proprietary" type systems of the prior art, it is never necessary to modify the entire system 2.

In reality, there are two main types of updates:

the update itself: a given domain $D_j$ having been initially installed, a more recent version of it is to be installed in order to incorporate either new functionalities or corrections. This operation specifically involves changing the version of the domain.

an add-on: this is the pure and simple addition of a particular domain, for example $D_n$, which was not initially installed.

It should also be clear that one or more domains can be removed.

All the domains 21 through 23 cooperate with the hardware platform 20 directly or via the basic domain or operating system 21. Likewise, all the "general-purpose" domains 22 cooperate with the specific domains 21 and 23. Vertical lines (in FIG. 2) illustrate this mode of operation.

According to another aspect of the invention, it is advantageous for the domains 22 to have the greatest possible independence relative to one another. In other words, it is important for the interactions between these domains to be minimized. Generally, however, there are existing relationships between some of the domains $D_1$ through $D_n$. These relationships are indicated by horizontal lines R (in FIG. 2).

Although in practice the number of domains is not limited a priori, the reasonable number of domains is preferably less than ten, and in any case must fall within the range of ten to twenty at maximum.

Otherwise, the complexity increases substantially: as a function of $x(x-1)/2$, x being the total number of domains. The advantages provided by the architecture according to the invention would in this case be greatly diminished.

Figure 3:
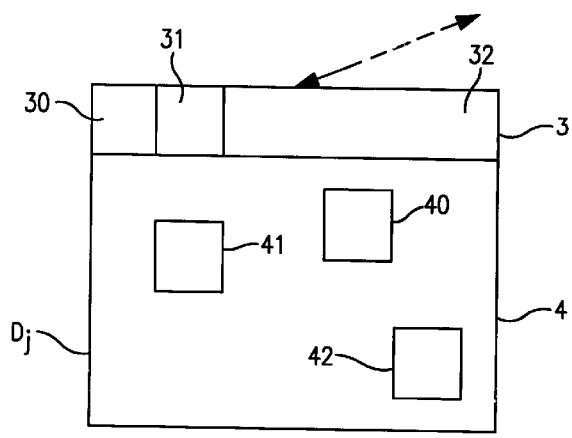
FIG. 3 schematically illustrates the structure of a domain, a basic component element of the architecture of FIG. 2.

The following is a more detailed description of the elementary unit constituted by a domain $D_j$ in reference to FIG. 3. This FIG. 3 schematically illustrates the structure of a domain, for example the domain $D_j$, with the arbitrary subscript $j$.

A domain $D_j$ may be defined as being a unit that is integrated, installed and updated independently. It comprises one or more sets of software from various sources, internal or external, which will be called products. The term "internal" indicates applications of the "proprietary" type. "External" indicates applications available on the market.

More precisely, a domain comprises two main parts.

A first part 4 is constituted by various products providing the functionalities specific to a domain, labelled 40 through 42. By way of example, a batch processing domain will provide at least the following functions: print management and back-up.

The second part 3 constitutes a particular interface of the domain $D_j$, called a "descriptor," which gives access to data describing the domain and its properties.

The functionalities provided by the domains $D_j$ are supported by products that are characterized, among other things, by the way in which they are integrated into the system 2, by the way in which they are installed and executed, and by the other products (that is, the other domains) on which they may depend.

A domain $D_j$ can only group products having identical, or at least compatible, characteristics. The latter are associated with it in the form of three attributes: the insertion level, the occurrence type, and the dependencies.

Thus, it is the domains that ensure and guarantee the various advantageous characteristics sought for the system as a whole, due to the homogeneity of the products which comprise them.

The part 3 or descriptor must therefore give access to :L$ information that characterizes a particular domain $D_j$, particularly to an identifier related to its name and its version, and to a list of its components. Moreover, as indicated above, a domain $D_j$ is characterized by a certain number of attributes, which will be described in detail below. All this information is necessary in order to be able to perform the above-mentioned basic operations: installation and updating of the domains. They also describe the operating mode of the products which comprise the domain.

In a preferred embodiment of the invention, there are three of these attributes, namely the insertion level, the occurrence type and the dependencies.

An insertion level is characterized by the way in which the products constituting the domain are integrated into it, that is, which functional characteristics are controlled, particularly during installation, and above all, updating operations.

To illustrate the concepts, in a practical embodiment of the invention, four insertion levels were defined.

These levels are schematically illustrated by FIGS. 4a through 4d, which represent four arbitrary domains with the respective insertion levels $N_0$ through $N_3$.

First of all, it is important to note that the products constituting the domains can be products developed by the manufacturer itself, which are said to be "proprietary," that is, from an internal source, or external products. The latter may have been added to in order to be better adapted to the system (FIG. 2). In this case, they are said to have added value.

Figures 4A, 4B, 4C, 4D:
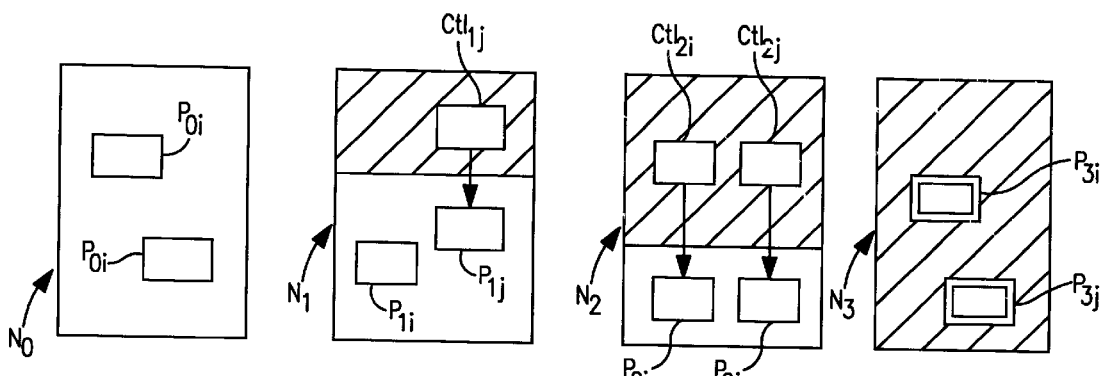
FIGS. 4a through 4d illustrate various types of domains.

This being noted, the "level 0", $N_0$ illustrated by FIG. 4a, comprises only external products, for example marked $P_{0i}$ and $P_{0j}$, without any added value. Seen from the system, a product $P_{0i}$ or $P_{0j}$ of a domain of level 0 is identical to a product that would be seen in an open system according to the prior art. No control is exerted over these products during their installation and/or is updating.

In reality, a domain of level 0 constitutes only a pseudo-domain. These products, for example $P_{0i}$ and $P_{0j}$, may be considered to constitute a set of products which are installed in the system, but which do not, strictly speaking, have the characteristics of the invention. However, this level offers the user of the system additional flexibility.

At the "level 1," $N_1$ illustrated by FIG. 4b, the products, for example $P_{1i}$ and $P_{1j}$, are not, strictly speaking, integrated into the system, but there can be an "added value" to these products and/or a control of the version of the product installed, at least for some of the products.

In FIG. 4b (and the subsequent figures), the hatching symbolically represents the parts of the domain comprising components that are actually integrated, for example control routines $CTL1_j$ for the product $P_{1j}$, the product $P_{1i}$ not being controlled at all (as in the case of level 0).

The products $P_{1i}$ and $P_{1j}$ retain their original "packaging" and the support provided by their designer. The updating of these products takes place independently from that of the domain and may or may not be controlled, as indicated above, by comparison with the data or with the aid of pre-established rules.

In an exemplary practical embodiment, the basic domain 21 (FIG. 2) provides the operating system, for example of the "AIX" (registered trademark) type. Thus, the domain 21 is at the insertion level 1.

FIG. 4c illustrates a domain $N_2$ of "level 2,". At this level, all the products, for example $P_{2i}$ and $P_{2j}$ are under the control of integrated routines $Ctl_{2i}$ and $Ctl_{2j}$. With this exception, level 2, of domain $N_2$ is entirely similar to level 1, of domain $N_1$. It is therefore unnecessary to describe its characteristics again.

FIG. 4d illustrates a domain $N_3$ with the insertion level 3, or the highest level. This level has all of the characteristics of the invention. In effect, all the components, for example $P_{3i}$ and $P_{3j}$ are fully integrated into the domain $N_3$, as represented symbolically in FIG. 4d by a double line surrounding these products.

If there are products from external sources, their packaging is entirely redefined, and these products are installed and updated in accordance with a standard procedure specific to the system, which procedure does not require any expertise on the product installed. Thus, only simple controls are necessary, such as simply controlling the version of the product to be installed or updated.

Therefore, at this insertion level, a domain can fully guarantee all the advantageous characteristics sought within the scope of the invention: robustness, availability, flexibility and upgrade capability.

A second attribute associated with a particular domain $D_j$ (FIG. 3) is the occurrence type. It characterizes the number of instances that can coexist and/or be executed simultaneously in the same node, it being understood that a node is a hardware element in a distributed system.

Advantageously, all the products comprising the same domain $D_j$, must have the same occurrence type. If not, the lowest occurrence type is retained.

Three main occurrence types may be defined:
  a first occurrence type, hereinafter called "SISR" (or "Single Install & Single Run"), allows only one occurrence of the domain in question and, a fortiori, only one execution. A version of a domain can only be replaced by replacing the preceding version.
  a second occurrence type, hereinafter called "MISR" (or "Multiple Install & Single Run"), allows a multiple installation of the domain in question in the same node, but only one execution. Each occurrence corresponds to a different version of the domain, but the same version of a product can exist in several occurrences in different versions of a domain.
  a third occurrence type, hereinafter called "MIMR" (or "Multiple Install & Multiple Run"), allows a multiple installation of the domain in question in the same node, and thus a multiple execution.

The occurrence type associated with a domain is very important, since it is a direct condition of the availability of the system during updates.

With an occurrence of the "SISR" type, there is only one instance of the domain in question and only this new instance can be executed; it is not possible to back out, at least not without removing the current instance. Moreover, the updating of a domain may require a complete stopping of the system.

With an occurrence of the "MISR" type, several instances corresponding to upgrades of the domain can coexist, although only one can be executed at a given time. It is possible, however, to choose the instance that will be executed. In other words, it is possible to stop the new instance without redoing an update. The removal of the old instance can be completely de-synchronized from the installation of the new instance. Operation can continue during the update. It need only be interrupted, at least where the products of the given domain are concerned, at the time of the switch-over to the new version.

With an occurrence of the "MIMR" type, since several instances can coexist and all of them can be executed simultaneously, it becomes possible to bring a new version into service progressively, for example continuing to run on the old version while running tests on the new one. Moreover, except for certain particular constraints, this occurrence type allows the installation of a new version without interrupting the operation of the product in question.

Therefore, this occurrence type offers maximum flexibility, while ensuring the advantageous characteristics noted.

Lastly, it should be noted that for the price of a repackaging, a product from an external source offering an initial occurrence of the "SISR" type, for example, can offer a higher occurrence of the "MISR" or even "MIMR" type, which makes it more advantageous.

A third attribute associated with a particular domain $D_j$ (FIG. 3) relates to the dependencies. The dependencies indicate the other domain or domains, $D_1$ through $D_n$, of the system 2 (FIG. 2) whose presence is necessary to the proper operation of the products of the domain $D_j$ in question. The dependencies of a domain $D_j$ are constituted by all of the dependencies identified at the level of each product constituting this domain.

In order to obtain the advantageous characteristics of the architecture of the invention, it is advantageous to group, in the same domain, only products having the same dependencies. Since the so-called basic (FIG. 2:21) and operations monitor (FIG. 2:23) domains constitute the heart of the system, all the other domains $D_1$ through $D_n$, have a dependency relative to these two specific domains. Lastly, when a domain has a multiple occurrence of the "MISR" or "MIMR" type, there must never be dependencies between these various occurrences.

The following is a detailed description of an exemplary practical organization of a domain $D_j$.

In this practical example, the domain is organized according to a hierarchy of objects. This structure only applies, stricto sensu, to the domains whose insertion attribute is at level 3 (see FIG. 4d) or, for the domains of insertion levels 1 and 2 (FIGS. 4b and 4c), to the fully integrated products (hatched areas of these figures).

Figure 5A:
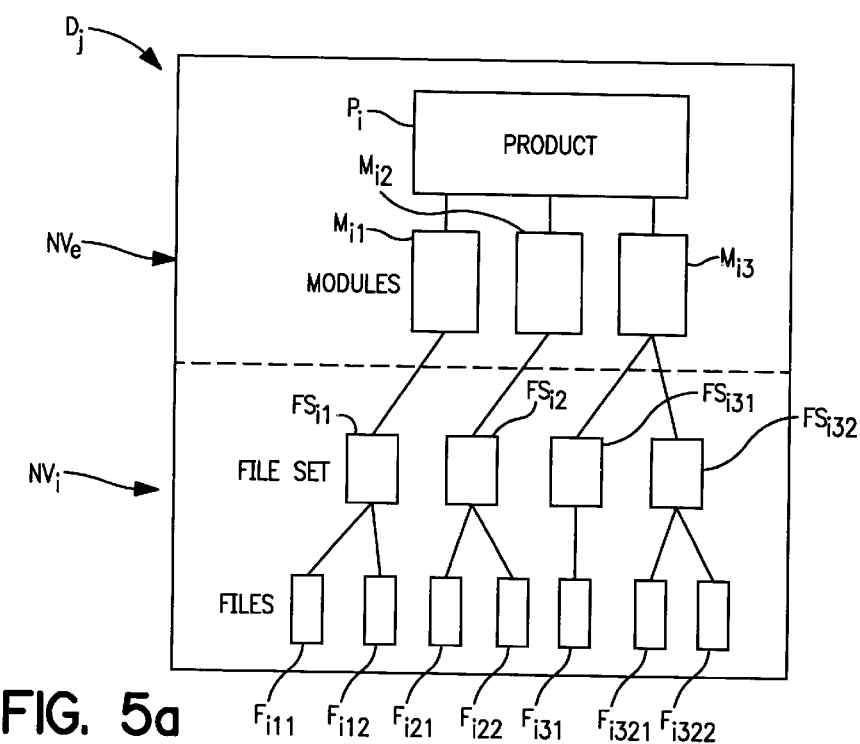
FIGS. 5a and 5b illustrate an exemplary hierarchic organization of the domains.
Figure 5B:
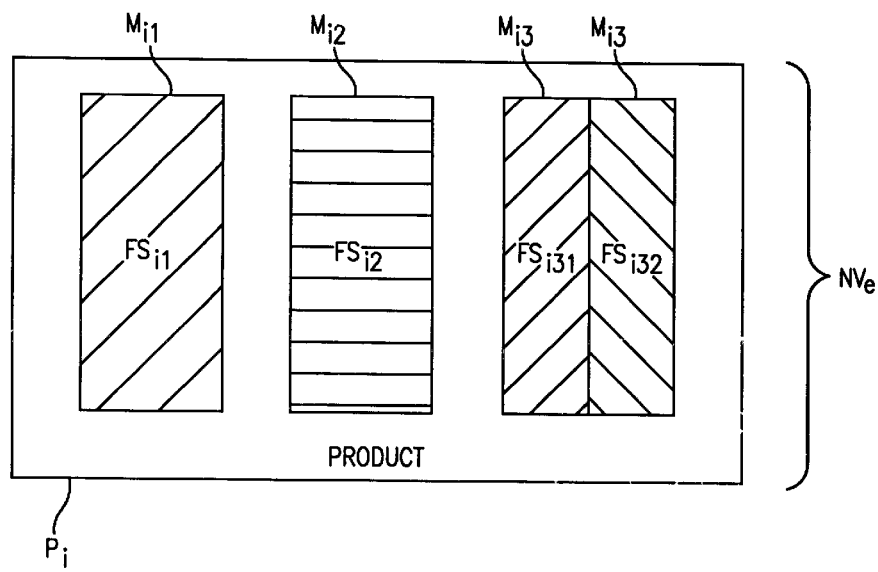

For purposes of simplification, a domain $D_j$ containing only one product $P_i$ will be considered below in reference to FIGS. 5a and 5b, it being understood that these dispositions also apply to domains comprising several products. In effect, it is clear that the basic structure of a domain is the product, as shown particularly in FIG. 5b, a domain comprising one or more products.

It is possible, however, to distinguish a four-level hierarchic structure, in an advantageous embodiment of the invention.

The first level is the product $P_i$ itself. It is a homogenous set providing a given functionality. The product is constituted by a set of modules $M_{i1}$ through $M_{i3}$ (three in the example described in FIG. 5a) or "packages," which constitute the second hierarchic level.

Thus, the second level groups the modules $M_{i1}$ through $M_{i3}$. A module $M_{i1}$ through $M_{i3}$ is a homogeneous functional subset of a product $P_i$. It is constituted by a set of "file sets" $FS_{i1}$, $FS_{i2}$ and $FS_{i31}$ and $FS_{i32}$ (in the example described in FIG. 5a).

These two levels constitute a first level of external visibility NVe, that is, they are "visible" by the user for an update of the domain $D_j$ and/or its initial installation.

Thus, it is possible to install all or some of the products of a domain $D_j$ as well as all or some of the modules that comprise them, naturally taking into account the consistency constraints connected with these products.

The third level groups the file sets $FS_{i1}$, $FS_{i2}$ and $FS_{i31}$ and $FS_{i32}$. A file set is a set of files which contributes to the performance of all or some of the functionalities offered by a module. A module, for example the modules $M_{i1}$ and $M_{i2}$, can comprise only one file set, respectively $FS_{i1}$ and $FS_{i2}$. On the other hand, a module can comprise two file sets or more. This is the case with the module $M_{i3}$, which comprises two file sets $FS_{i31}$ and $FS_{i32}$.

The fourth level is constituted by the files themselves, $F_{i11}$, $F_{i12}$, $F_{i21}$, $F_{i22}$, $F_{i321}$, $F_{i322}$. Each file set can comprise one or more files.

The third and fourth levels constitute an internal visibility level NVi, not visible by the user in normal utilization. However, the updates involve this level.

The basic structure of a product being hierarchical, the following rules must be followed:
- a module belongs to one product and one product only, and contains at least one file set;
- a file set belongs to one module and one module only, and contains at least one file;
- a file belongs to one file set and one file set only.

A domain $D_j$ is a set of products and modules. It always comprises at least one module and one set of specific files which describe the domain $D_j$. This set of specific files comprises at least one equally specific file containing the list, that is the name and version number, of all the other file sets of the domain $D_j$. In addition to its role as a container, this particular file serves to ensure the consistency of the domain $D_j$. In effect, according to a characteristic of the invention, all the other file sets of the domain $D_j$ are declared dependent on the set of specific files. The installation or updating of any file set belonging to the domain $D_j$ is only possible if the version of the domain allows it, at least in terms of the products controlled or integrated (insertion levels 1 through 3).

The usage of the file sets also differs according to the insertion level in question.

In a domain of insertion level 3, the file sets are constituted by executable programs of the product.

In a domain of insertion level 1 or 2, the file sets, with the exception of those that have "added value," do not contain the products themselves, the products being external to the domain, since they are from external sources. They serve only to describe them and to perform version controls during installation and/or updating. Generally, for the installation of a product from an external source, it is necessary for the file set of the domain to contain utilities in the form of "scripts" which run during the effective installation and perform verifications on the actual product. These scripts can also initiate the installation of the product itself or its update.

Figure 6:
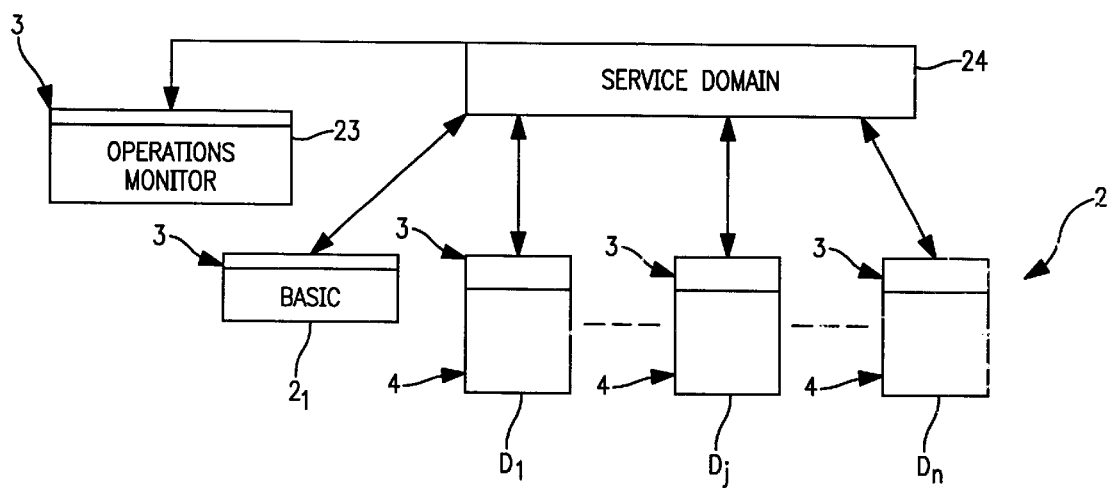
FIG. 6 illustrates a particular domain and its relationships with the other domains of the system.

In a particular embodiment of the invention, illustrated schematically by FIG. 6, the system 2 can comprise a third specific domain 24, which may be called the service domain or "tools" domain.

This domain comprises, in particular, software products or utilities that are equally specific, which allow the installation and/or updating of all or some of the domains $D_1$ through $D_n$, and within each domain, of all or some of the products, whether they are from sources that are internal, that is, a priori fully integrated into the domains, or external, which external products may or may not be controlled, depending on the insertion level associated with the domain. Naturally, the installation and updating tools, or "engines" present in this domain interact with the domains $D_1$ through $D_n$, as well as with the basic domain 21, and the operations monitor domain 23, and more particularly with their descriptor sets 3. The installations take place according to the rules recorded in the domain 24 and or the descriptor sets 3.

Referring once again to FIG. 3, the so-called descriptor 3 gives access to at least one record 30 containing the name and the version of the domain $D_j$, to a record 31 describing the attributes associated with this domain, to a record 32 for describing the content of the domain and to a set of rules for installing and updating the domain and the products that comprise it. As described in regard to FIG. 5a, each domain $D_j$ comprises a specific file set containing the list of the other file sets, that is, at least their names and version numbers. This information may also be completed with scripts and rules for installing and updating products external to the domain.

Although the information listed above can be distributed within a given domain, the latter is "seen" identically from the outside via the descriptor set 3, which constitutes a standard interface for all the domains, even if the content of the accessed information differs from one domain to another.

From the preceding description, it is possible to summarize the organization of the domains and the main rules for their utilization as follows:
- each domain is constituted by a set of file sets, which can themselves be grouped into modules and products,
- each domain contains a set of specific files that determines its name and version;
- all of the domains are comprised of non-contiguous file sets or, in other words, any two distinct domains can contain only file sets that are different;
- any change in a file set of a domain from one version of this domain to the next must follow the so-called "forward compatibility" rule: a file set of version m+1 replacing the version m, m being arbitrary, does not involve any regression in any of the other file sets that have not changed;
- and the functional dependencies are defined at the level of the file sets, but they are made visible globally at the level of the domains (dependencies attribute).

By reading the preceding, it may easily be determined that the invention fully achieves the objects set forth.

It makes it possible to maintain both the essential advantages of the architecture of so-called "open" systems and the advantages of the architecture of the so-called "proprietary" systems, that is, robustness, availability, security, flexibility, and upgrade capability, without having their drawbacks.

It even supports the installation and updating of products from external sources in accordance with their own specific procedures, with a minimum of control (version), or even no control at all. Naturally, in the latter case, and for these products only, the configuration is similar to that of an "open" system. This option makes it possible to obtain greater flexibility, although it does not obtain all the advantages associated with "proprietary" systems. However, the products in question, if they exist, can be clearly indexed due to the domain-based architecture specific to the invention, and the risk of the appearance of problems can also be clearly delimited. Finally, it is important to recall that for products from external sources, even those without "added value," that are subjected to a version control, this control limits the above-mentioned risks.

It should be clear, however, that the invention is not limited to the exemplary embodiments explicitly described, particularly in relation to FIGS. 2 through 6. In particular, the number of domains comprising a system and/or their composition are entirely dependent on the precise application of the information processing system, as well as the specific needs of the user.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. An architecture for an information processing system, said system comprising a hardware platform (20) that cooperates with a set of software products, said set of software products being subdivided into subsets called domains (21–24), each domain having at least one of said software products (40–42), and an interface called a descriptor (3), said descriptor providing access to a specific determined information (30–32), said specific determined information including at least one identifier (30) of the domain and data (32) describing the software products in the corresponding domain, said descriptor for at least one of said domains further including first and/or second information, said first information relating to predetermined installation and updating rules common to the system and said second information relating to at least one of said software products which has specific installation and updating rules, said second information allowing a control by the system of said specific installation and updating rules, and means for installing and/or updating said domains (21–24) with reference to said specific determined information (30–32).

2. The architecture according to claim 1, wherein said identifier (30) comprises at least the information of the domain name and version.

3. The architecture according to claim 1, wherein said specific determined information also comprises at least one attribute associated with the corresponding domain and describing specific functional characteristics associated with the corresponding domain.

4. The architecture according to claim 3, wherein said at least one attribute represents, according to a predetermined scale of levels relating to said first and/or second information, a level of integration and control of said software products ($P_{0i}$ through $P_{3j}$) of the corresponding domain ($D_j$).

5. The architecture according to claim 4, wherein said scale of levels includes an upper level ($N_3$) for which all of said software products in the corresponding domain relate only to said first information.

6. The architecture according to claim 4, wherein said scale of levels includes at least one intermediate level ($N_0$–$N_2$) for which at least one of said software products ($P_{0i}$ through $P_{2j}$) in the corresponding domain relates to said second information.

7. The architecture according to claim 3, wherein the domain corresponding to said at least one attribute can have instances and said at least one attribute represents the combination of the number of said instances of domain ($D_j$) which can be installed and can coexist in said system (2), with or without the possibility of running said instances simultaneously.

8. The architecture according to claim 7, wherein said at least one attribute can be selected among a first attribute representative of only one installation of said corresponding domain ($D_j$) into the system (2) and only one execution, a second attribute representative of a multiple installation of said corresponding domain and only one execution, and a third attribute representative of multiple installation of said domain and a multiple execution.

9. The architecture according to claim 3, wherein said at least one attribute of said corresponding domain and points to at least one other domain whose presence within said system (2) is required for the operation of at least some of said software products of said corresponding domain ($D_j$).

10. The architecture according to claim 1, wherein said domains ($D_j$) have a four-level hierarchic structure, said software products ($P_i$) representing a first level and each comprising at least one module ($M_{i1}$–$M_{i3}$) representing a second level, each module ($M_{i1}$–$M_{i3}$) comprising at least one file set ($FS_{i1}$–$FS_{i32}$) representing a third level, and each file set ($FS_{i1}$–$FS_{i32}$) comprising at least one file ($F_{i11}$–$F_{i322}$) representing a fourth level, and wherein a determined file belongs to only one file set, a file set belonging to only one module and a module belonging to only one software product.

11. The architecture according to claim 10, wherein each of said domains ($D_j$) comprises at least one module containing a set of specific files for recording said domain identifier and said data on the software products comprising the domain.

12. The architecture according to claim 10, wherein said at least one file set includes said second information.

13. The architecture according to claim 10, wherein said file sets present in a corresponding domain ($D_j$) are non-contiguous to one another.

\* \* \* \* \*